United States Patent [19]

Hayes

[11] 3,773,686

[45]*Nov. 20, 1973

[54] SIX-STEP REGENERATION PROCEDURE FOR A COKE-DEACTIVATED BIMETALLIC PLATINUM GROUP-GROUP IV A CATALYST

[75] Inventor: John C. Hayes, Palatine, Ill.

[73] Assignee: Universal Oil Products Company, Des Plaines, Ill.

[ * ] Notice: The portion of the term of this patent subsequent to Jan. 11, 1989, has been disclaimed.

[22] Filed: Sept. 9, 1971

[21] Appl. No.: 179,156

Related U.S. Application Data

[63] Continuation-in-part of Ser. No. 797,272, Feb. 6, 1969, Pat. No. 3,634,292.

[52] U.S. Cl.................. 252/415, 208/140, 252/419
[51] Int. Cl........................ B01j 11/02, B01j 11/18
[58] Field of Search.............. 252/415, 419, 466 PT; 208/140

[56] References Cited
UNITED STATES PATENTS

| | | | |
|---|---|---|---|
| 3,634,292 | 1/1972 | Hayes | 252/415 |
| 3,661,768 | 5/1972 | Davis, Jr. et al. | 252/415 |
| 3,617,520 | 11/1971 | Kluksdahl | 208/138 |
| 3,674,706 | 7/1972 | Box, Jr. et al. | 208/140 |
| 3,654,184 | 4/1972 | McCallister et al. | 208/139 |
| 3,649,565 | 3/1972 | Wilhelm | 252/466 PT |
| 3,576,766 | 4/1971 | Rausch | 252/466 PT |
| 3,531,543 | 9/1970 | Clippinger et al. | 252/466 PT |
| 3,511,888 | 5/1970 | Jenkins | 208/138 |
| 2,892,770 | 6/1959 | Coley et al. | 252/416 |

Primary Examiner—Daniel E. Wyman
Assistant Examiner—P. E. Konopka
Attorney—James R. Hoatson, Jr. et al.

[57] ABSTRACT

A deactivated hydrocarbon conversion catalyst, which is a combination of a platinum group component, a group IVA metallic component, and a halogen component with a porous carrier material and which has been deactivated by a deposition of carbonaceous materials thereon during a previous contacting with a hydrocarbon charge stock at an elevated temperature, is regenerated by the sequential steps of: (1) burning carbon therefrom at a relatively low temperature with a gas stream containing $H_2O$ and a small amount of $O_2$, (2) treating with a gas stream containing $H_2O$ and a small amount of $O_2$ at a relatively high temperature, (3) treating with a gas stream containing $H_2O$ and a large amount of $O_2$ at the relatively high temperature, (4) treating with a gas stream containing halogen or a halogen-containing compound and water, (5) purging $O_2$ and $H_2O$ from the resulting catalyst and (6) reducing with a dry hydrogen stream. Key features of the resulting method are: (1) presence of water in the gas streams used in all steps except the purging and reduction steps, (2) careful control of the inlet temperature used during each step, (3) adjustment of halogen content of the catalyst after the carbon-burning step and prior to the reduction step, (4) careful control over the composition of the gas streams used in the various steps thereof and (5) exclusion of sulfur compounds from all gas streams utilized.

21 Claims, No Drawings

SIX-STEP REGENERATION PROCEDURE FOR A COKE-DEACTIVATED BIMETALLIC PLATINUM GROUP-GROUP IV A CATALYST

CROSS REFERENCES TO RELATED APPLICATIONS

This application is a continuation-in-part of my prior, copending application Ser. No. 797,272 which was filed on Feb. 6, 1969 now U.S. Pat. No. 3,634,292.

The subject of the present invention is a method for regenerating a coke-deactivated, bimetallic hydrocarbon conversion catalyst comprising a combination of a platinum group component, a group IVA metallic component, and a halogen component with a porous carrier material. More specifically, the present invention is a method for regenerating a deactivated hydrocarbon conversion catalyst comprising a combination of platinum, a group IVA metallic component and halogen with an alumina carrier material where the catalyst has been deactivated by the deposition of carbonaceous materials thereon during a previous contacting with a hydrocarbon charge stock at an elevated temperature. In essence, the present invention provides a specific sequence of carbon-burning and catalyst treatment steps designed to result in a regenerated catalyst possessing activity, selectivity, and stability characteristics which are comparable to those observed with the fresh undeactivated catalyst.

Composites having a hydrogenation-dehydrogenation function and a cracking function are widely used today as catalysts in many industries, such as the petroleum and petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as one or more of the transition metals or compounds of the transition metals of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction, which is relatively rich in straight-chain paraffin components, is contacted with a dual-function catalyst to produce an output stream rich in isoparaffin compounds.

Regardless of the reaction involved or the particular process involved, it is of critical importance that th dual-function catalyst exhibit not only the capability to initially perform the specific functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used — that is, the temperature, pressure, contact time, and presence of diluents, such as $H_2$; (2) selectivity refers to the amount of the desired product and/or products obtained as a function of the amount of reactant converted or charged; (3) stability refers to the rate of change with time of the activity and selectivity parameters — obviously the smaller rate implying the more stable catalyst. In a reforming process, for example, activity commonly refers to the amount of conversion that takes place for a given charge stock at a specific severity level and is typically measured by octane number of the $C_5+$ product stream; selectivity refers to the amount of $C_5+$ yield that is obtained relative to the amount of the charge stock at the particular severity level; and stability is typically equated to the rate of change with time of activity, as measured by octane number of $C_5+$ product, and of selectivity, as measured by $C_5+$ yield. Actually, the last statement is not strictly correct because generally a continuous reforming process is run to produce a constant octane $C_5+$ product with the severity level being continuously adjusted to attain this result; and, furthermore, the severity level for this process is usually varied by adjusting the conversion temperature in the reaction zone so that, in point of fact, the rate of change of activity finds response in the rate of change of conversion temperature, and changes in this last parameter are customarily taken as indicative of activity stability.

As is well known to those skilled in the art, the principal cause of observed deactivation or instability of these dual-function catalysts when they are used in a hydrocarbon conversion reaction is associated with the formation of coke or carbonaceous materials on the surface of the catalyst during the course of the reaction. More specifically, the conditions utilized in these hydrocarbon conversion processes typically result in the formation of heavy, black, solid or semi-solid carbonaceous material which deposit on the surface of the catalyst and gradually reduce its activity by shielding its active sites from the reactants. Recently, there has been developed a new type of dual-function catalytic composites which possess improved activity, selectively and stability characteristics when they are employed in a process for the conversion of hydrocarbons of the type which has heretofore utilized dual-function, platinum-containing catalytic composites such as processes for isomerization, dehydrogenation, hydrogeneration, alkylation, transalkylation, dealkylation, cyclization, dehydrocyclization, cracking, hydrocracking, reforming, and the like processes. In particular, it has been determined that the use of a bimetallic catalyst comprising a combination of a platinum group component, a group IVA metallic component, and a halogen component with a porous carrier material can enable the performance of hydrocarbon conversion processes that have traditionally utilized dual-function platinum-containing catalysts to be substantially improved. For example, it has been demonstrated that the overall performance characteristics of a catalytic reforming process can be sharply improved by the use of these group IVA-containing bimetallic catalytic composites. Not unexpectedly, the deactivation of these recently developed dual-function, bimetallic hydrocarbon conversion catalysts occur in much the same manner as for any other hydrocarbon conversion catalyst having a platinum metal component when it is employed in the hydrocarbon conversion service. Accordingly, the principal mode of deactivation of these recently developed bimetallic catalysts is the deposition of coke, volatile hydrocarbons, and other carbonaceous material on the surface of the catalyst which eventually cover the catalytically active sites of the catalyst, thereby shielding them from the reactants or blocking access of the reactants to the sites. These deposits cause a gradual decline in activity and selectivity of the catalyst and a gradual loss of its capability to perform its intended function. Depending somewhat on the performance requirements imposed on the process utilizing the catalyst, at some point in time the catalyst becomes so clogged with carbonaceous materials that it either must be regenerated or discarded. Heretofore, substantial difficulty has been encountered in regenerating these recently developed bimetallic hydrocarbon conversion catalysts. More specifically, it has been determined that the application of conventional regeneration techniques which have long been practiced in the art of regenerating dual-function, monometallic hydrocarbon conversion catalysts, has not been successful in restoring the initial activity, selectivity, and stability characteristics of these bimetallic catalysts. Typically, the application of conventional carbon-burning procedures with oxygen-containing gases results in a regenerated catalyst having an extremely low activity and containing a reduced amount of halogen component. Attempts at restoring the initial level of halogen contained in the catalyst by well known halogen adjustment procedures on the regenerated catalyst have not been successful.

The problem addressed by the present invention is, accordingly, the regeneration of a bimetallic hydrocarbon conversion catalyst comprising a combination of a platinum group component, a group IVA metallic component, and a halogen component with a porous carrier material, when the catalyst has been deactivated by carbonaceous deposits.

The conception of the present invention was facilitated by my recognition that the adverse effects that have heretofore been commonly encountered in attempts to regenerate this type of bimetallic catalyst by conventional oxygen-burning techniques were caused by a failure to carefully control the composition of the gas streams used in the various steps of the regeneration method coupled with a failure to carefully control the temperature used in each of the steps of the regeneration procedure. I have now found a specific sequence of interrelated steps which enable the successful regeneration of this type of bimetallic hydrocarbon conversion catalyst, and essential features of my method are: careful control of the temperature used in each of the regeneration steps, the presence of water in all steps except the purging and reduction steps, adjustment of the halogen component of the catalyst after removal of carbonaceous material from the catalyst but prior to the reduction step, careful control of the composition of the gas streams used in the various steps thereof, and exclusion of sulfur compounds from all gas streams utilized.

In my prior application I disclosed a six-step regeneration procedure which was directed at solving the problem of regenerating an extremely sensitive bimetallic catalyst containing a platinum group component and a rhenium component. I have now ascertained that: (1) a bimetallic catalyst containing a platinum group component and a group IVA metallic component possesses not only activity, selectivity and stability characteristics which are analogous to a platinum-rhenium catalyst, but also a similar sensitivity to the procedure used to regenerate it when it is deactivated by carbonaceous deposits, and (2) the six-step procedure disclosed in my prior application can be used to successfully regenerate this latter type of catalyst.

It is, therefore, a principal object of the present invention to provide a method for regenerating a hydrocarbon conversion catalyst comprising a combination of a platinum group component, a group IVA metallic component, and a halogen component with a porous carrier material which catalyst has been deactivated by contact with a hydrocarbon charge stock at elevated temperatures. A corollary object is to provide a solution to the problem of regenerating these recently developed bimetallic catalysts which solution enables the substantial restoration of the activity, selectivity, and stability characteristics of the original catalyst. An overall object is to extend the total catalyst life of these recently developed bimetallic catalysts and to obtain more efficient and effective use of these catalysts during their active life.

In brief summary, the present invention is a method for regenerating a deactivated hydrocarbon conversion catalyst comprising a combination of a platinum group component, a group IVA metallic component, and a halogen component with a porous carrier material — the catalyst having been deactivated by deposition of carbonaceous materials thereon during a previous contacting with a hydrocarbon charge stock at elevated temperatures. The first step of the method is the carbon-burning step and it comprises contacting the deactivated catalyst with a substantially sulfur compound-free first gaseous mixture consisting essentially of about 0.2 to about 3 mole percent $O_2$, about 0.02 to about 25 mole % $H_2O$ and an inert gas at a pressure sufficient to maintain flow of the mixture through the catalyst and at a temperature of about 350° to about 500° C. for a first period sufficient to substantially remove the carbonaceous materials therefrom. Thereafter, the catalyst resulting from the carbon-burning step is subjected to contact with a substantially sulfur compound-free second gaseous mixture consisting essentially of about 0.2 to about 3 mole % $O_2$, about 0.02 to about 25 mole % $H_2O$, and an inert gas for a second period of at least about 0.5 to 5 hours at a temperature of about 500° to about 550° C. and at a pressure sufficient to maintain flow of the mixture through the catalyst. In the third step, the catalyst resulting from the second step is contacted with a substantially sulfur compound-free third gaseous mixture consisting essentially of about 10 to about 25 mole % $O_2$, about 0.2 to about 25 mole % $H_2O$, and an inert gas for a third period of at least about 1 to 5 hours at a temperature of about 500° to 550° C. and at a pressure sufficient to maintain flow of said mixture through the catalyst. The catalyst from the third step is then, in the fourth step, subjected to contact with a substantially sulfur compound-free fourth gaseous mixture comprising about 1 to about 30 mole % $H_2O$, about 0.05 to about 5 vol. percent of a halogen or halogen-containing compound and air or an inert gas for a fourth period of at least about 1 to about 10 hours at a temperature of about 400° to about 550° C. and at a pressure sufficient to maintain low of the mixture through the catalyst. Thereafter, oxygen and water are purged from contact with the resulting catalyst by means of a suitable gas stream. In the final step, the resulting catalyst is subjected to contact with a substantially water-free and sulfur compound-free hydrogen stream at a temperature of about 400° to about 600° C. for a final period of at least about 0.5 to about 5 hours, thereby producing a regenerated hydrocarbon conversion catalyst having activity, selectivity, and stability characteristics comparable to those possessed initially by the fresh catalyst.

Other objects and embodiments of the present invention encompass further details about the bimetallic catalysts that can be regenerated thereby, the condition and reagents used in each step of the regeneration method, and the mechanics associated with each of these steps. These embodiments and objects will be hereinafter disclosed in the following detailed description of each of the essential and preferred steps of the present invention.

The present invention involves a regeneration procedure which is applicable to a bimetallic catalyst comprising platinum group component, a group IVA metallic component and a halogen component combined with a porous carrier material. Considering first the porous carrier material utilized in the type of catalysts regenerated by the present invention, the carrier material is typically a porous, adsorptive, high-surface area support having a surface area of about 25 to about 500 $m^2/g$. The porous carrier material should be relatively refractory to the conditions utilized in the hydrocarbon conversion process; examples of acceptable carriers are: (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chrominum oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multivalent cations; and, (6) combinations of one or more elements from these groups. The preferred porous carrier materials are refractory inorganic oxides, with best results usually obtained with an alumina carrier material. Suitable alumina materials are the crystalline aluminas known as the gamma-, eta-, and theta-aluminas, with gamma-alluminas giving best results. In addition, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 g/cc and surface area characteristics such that the average pore diameter is about 20 to 300 Angstroms, the pore volume is about 0.1 to about 1 ml/g and the surface area is about 100 to about 500 $m^2/g$. In general, excellent results are typically obtained with a gamma-alumina carrier material which is used in the form of spherical particles having: a relatively small diameter (i.e., typically about 1/16 inch), an apparent bulk density of about 0.5 g/cc, a pore volume of about 0.4 ml/g and a surface area of about 175 $m^2/g$.

One essential constituent of the type of catalyst regenerated by the present method is the group IVA metallic component. By the use of the generic term "group IVA metallic component" it is intended to cover the metals and compounds of the metals of group IVA of the Periodic Table. More specifically, it is intended to cover: germanium and the compounds of germanium; tin and the compounds of tin; lead and the compounds of lead; and mixtures of these metals and/or compounds of metals. This group IVA metallic component may be present in the catalytic composite as an elemental metal, or in chemical combination with one or more of the other ingredients of the composite, or as a chemical compound of the group IVA metal such as the oxide, sulfide, halide, oxyhalide, oxychloride, aluminate, and the like compunds. Based on the evidence currently available, it is believed that best results are obtained when the group IVA metallic component exists in the final composite in an oxidation state above that of the elemental metal. Regardless of the state in which this component exists in the composite, it can be utilized therein in any amount which is catalytically effective with the preferred amount being about 0.01 to about 5 wt. percent thereof, calculated on a carbonaceous material-free and elemental basis. The exact amount selective within this broad range is preferably determined as a function of the particular group IVA species that it utilized. For instance, in the case where this component is lead, it is preferred to select the amount of this component from the low end of this range — namely, about 0.01 to about 1 wt. percent. In the case where this component is tin, it is preferred to select from a relatively broader range of about 0.05 to about 2 wt. percent thereof. And, in the preferred case, where this component is germanium, the selection can be made from the full breadth of the stated range — specifically, about 0.01 to about 5 wt. percent with best results at about 0.05 to about 2 wt. percent. This group IVA component may be incorporated in the composite in any suitable manner known to the art such as by coprecipitation or cogellation with the porous carrier material, ion exchange with the carrier material, or impregnation of the carrier material at any stage in its preparation. However, best results are believed to be obtained when the group IVA component is uniformly distributed throughout the porous carrier material. One acceptable method of incorporating the group IVA component into the catalytic composite involves cogelling the group IVA component during the preparation of the preferred carrier material, alumina. This method typically involves the addition of a suitable soluble compound of the group IVA metal of interest to the alumina hydrosol. The resulting mixture is then commingled with a suitable gelling agent such as a relatively weak alkaline reagent, and the resulting mixture is thereafter preferably gelled by dropping into a hot oil bath. After aging, drying and calcining the resulting particles there is obtained an intimate combination of the oxide of the group IVA metal and alumina. One preferred method of incorporating this component into the composite involves utilization of a soluble, decomposable compound of the particular group IVA metal of interest to impregnate the porous carrier material either before, during or after the carrier material is calcined. In general, the solvent used during this impregantion step is selected on the basis of its capability to dissolve the desired group IVA compound without affecting the porous carrier material which is to be impregnated; ordinarily, good results are obtained when water is the solvent; thus the preferred group IVA compounds for use in this impregnation step are typically water-soluble and decomposable. Examples of suitable group IVA compounds are: germanium difluoride, germanium tetrafluoride, germanium dioxide, germanium monosulfide, tin dibromide, tin dibromide di-iodide, tin dichloride di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the group IVA component is germanium, a preferred impregnation solution is germanium tetrachloride dissolved in anhydrous alcohol. In the case of tin, tin chloride dissolved in water is preferred. And in the case of lead, lead nitrate in water is preferred. Regardless of which impregnation solution is utilized the group IVA component can be impregnated either prior to, simultaneously with, or after the platinum group component is added to the carrier material. Ordinarily, best results are obtained when this component is impregnated simultaneously with the platinum group component. Likewise, best results are ordinarily obtained when the group IVA component is germanium or a compound of germanium.

A second essential ingredient of the type of bimetallic catalyst which can be regenerated by the present method is the platinum group component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2 wt. percent of the final catalytic composite, calculated on a carbonaceous material-free and elemental basis. Excellent results are obtained when the catalyst contains about 0.05 to about 1 wt. percent of the platinum group metal. The preferred platinum group component is platinum or a compound of platinum, although good results are obtained when it is palladium or a compound of palladium. The platinum group component may be incorporated in the catalytic composite in any suitable manner such as coprecipitation or cogellation, ion-exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of chloroplatinic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, palladium nitrate, palladium sulfate, etc. Hydrogen chloride or the like acid is also generally added to the impregnation solution in order to further facilitate the incorporation of the halogen component and the distribution of the metallic component.

Another essential ingredient of the type of catalysts regenerated by the present method is a halogen component. Although the precise form of the chemistry of the association of the halogen component with the carrier material is not entirely known, it is customary in the art to refer to the halogen component as being combined with the carrier material, or with the other ingredients of the catalyst as the halide (e.g. chloride or fluoride). This combined halogen may be either fluorine, chlorine, iodine, bromine, or mixtures thereof. Of these, fluorine and particularly chlorine are preferred for the purposes of the present invention. The halogen may be added to the carrier material in any suitable manner either during preparation of the support or before or after the addition of the other components. For example, the halogen may be added at any stage of the preparation of the carrier material or to the calcined carrier material, as an aqueous solution of a suitable water-soluble, decomposable halogen-containing compound such as hydrogen fluoride, hydrogen chloride, hydrogen bromide, ammonium chloride, etc. The halogen component or a portion thereof may be combined with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5 wt. percent and preferably about 0.5 to about 1.5 wt. percent of halogen calculated on a carbonaceous material-free and elemental basis. In isomerization or hydrocracking embodiments, it is generally preferred to utilize relatively larger amounts of halogen in the catalyst — typically ranging up to about 10 wt. percent halogen calculated on the same basis, and more preferably about 1 to about 5 wt. percent.

After impregnation of the catalytic components into the porous carrier material, the resulting composite is, in the preferred method of preparing this type of bimetallic catalyst, typically subjected to a conventional drying step at a temperature of about 200° F. to about 600° F. for a period of about 1 to 24 hours. Thereafter, the dried composite is typically calcined or oxidized at a temperature of about 700° F. to about 1100° F. in an air stream for a period of about 0.5 to about 10 hours. Moreover, conventional prereduction, halogen adjustment and presulfiding treatments are typically performed in the preparation of catalystic composites which can be regenerated by the method of the present invention. In fact, it is preferred to incorporate about 0.01 to about 0.5 wt. percent of sulfur component into the subject catalyst by a conventional presulfiding step.

In a preferred embodiment, the catalyst regenerated by the present invention is a combination of a platinum component, a chlorine component, and a group IVA metallic component with an alumina carrier material. These components are preferably present in amounts sufficient to result in the catalyst containing, on a carbonaceous material-free and elemental basis, about 0.1 to 3.5 wt. percent chlorine, about 0.01 to about 2 wt. percent platinum and about 0.01 to about 5 wt. percent group IVA metal. In the case where the group IVA metallic component is tin, this catalyst preferably contains 0.05 to about 2 wt. percent tin. Likewise when the group IVA metallic component is germanium, the amount of germanium is preferably abou4 0.01 to about 5 wt. percent thereof.

As indicated hereinbefore, the principal utility for this type of bimetallic catalyst is in a hydrocarbon conversion process wherein a dual-function hydrocarbon conversion catalyst having a hydrogenation-dehydrogenation function and an acid-acting function has been traditionally used; for example, these catalysts are used in catalytic reforming process with excellent results. In a typical reforming process, a hydrocarbon charge stock boiling in the gasoline range and hydrogen are contacted with the bimetallic catalyst in a conversion zone at reforming conditions. The hydrocarbon charge stock will typically comprise hydrocarbon fractions containing naphthenes and paraffins that boil within the gasoline range. The preferred class of charge stocks include straight run gasolines, natural gasolines, synthetic gasolines, etc. The gasoline charge stock may be a full boiling range gasoline having an initial boiling point of about 50° to about 150° F., and an end boiling point within the range of about 325° to 425° F., or it may be a selective fraction thereof which generally will be a higher boiling fraction commonly referred to as a heavy naphtha — for example, a naphtha boiling in the range of $C_7$ to 400° F. provides an excellent charge stock. In general, the conditions used in the reforming process are: a pressure of about 50 to about 1,000 psig. with the preferred pressure being 100 to about 600 psig., a temperature of about 800° to about 1,100° F. and preferably about 900° to about 1,050° F., a hydrogen to hydrocarbon mole ratio of about 2 to about 20 moles of $H_2$ per mole of hydrocarbon and preferably about 4 about 10 moles $H_2$ per mole of hydrocarbon, and a liquid hourly space velocity (which is defined as the equivalent liquid volume flow rate per hour of the hydrocarbon charge stock divided by the volume of the bed of catalyst particles) of about 0.1 to about 10 hr.$^{-1}$, with a value in the range of about 1 to about 3hr.$^{-1}$ giving best results.

When the bimetallic catalysts of the type described above are employed in the conversion of hydrocarbons, particularly the reforming process outlined above, the activity, selectivity, and stability of these catalysts are initially quite acceptable. For example, in a reforming process this type of catalyst has several singular advantages, among which are increased $C_5+$ yield, decreased rate of coke laydown on the catalyst, increased hydrogen make, enhanced stability of both $C_5+$ yield and temperature necessary to make octane, and excellent catalyst life before regeneration becomes necessary. However, the gradual accumulation of coke and other deactivating carbonaceous deposits on the catalyst will eventually reduce the activity and selectivity of the process to a level such that regeneration is desirable. Ordinarily, regeneration becomes desirable when about 0.5 to about 15 wt. percent or more of carbonaceous deposits have formed upon the catalyst.

When the performance of the bimetallic catalyst has decayed to the point where it is desired to regenerate the catalyst, the introduction of the hydrocarbon charge stock into the conversion zone containing the catalyst is stopped. Thereafter, the six-step regeneration method of the present invention is performed either in situ or the catalyst may be unloaded from the conversion zone and regenerated in an off-line facility.

It is to be carefully noted that it is an essential feature of the subject regeneration method that the composition of the gas streams used in the various steps thereof are carefully controlled, and the positive requirements for the comosition of each of these gas streams are given hereinafter in a manner which excludes the presence of other materials. In particular, it is a critical feature of the present invention that the gas streams used during the carbon-burning step, the two oxygen-treating steps, and the halogen-adjustment step are substantially free of compounds of sulfur — particularly, oxides of sulfur and $H_2S$. Quantitatively, this means substantially less than 5 vol. ppm. sulfur and preferably less than 2 vol. ppm. Likewise, it is essential that the hydrogen stream used during the reduction step be substantially free of both water and sulfur compounds such as $H_2S$. That is, less than 10 vol. ppm. in the case of water and less than 5 5 vol. ppm in the case of sulfur. It is, therefore, evident that the gas streams used in each of the steps of the present invention may be once-through streams or recycle streams; provided that in this latter case, the recycle streams are carefully controlled to insure that the positive limitations given hereinafter on the contents of the various gas streams are satisfied, and are treated by conventional techniques to insure the absence of detrimental constituents therefrom. Furthermore, it is to be noted that the temperatures and pressures given hereinafter for each of the steps refer to the temperature and pressure of the gas stream used therein just before it contacts the catalyst.

According to the present invention, the first essential steps of the regeneration procedure is the carbon-buring step and it involves contacting the deactivated catalyst with a first gaseous mixture consisting essentially of about 0.2 to about 3 mole percent $O_2$, about 0.02 to about 25 mole perent $H_2O$ and an inert gas such as nitrogen, helium, carbon dioxide, etc., or mixtures of these. In a preferred mode of operation, the gaseous mixture used in this step contains about 0.5 to about 2 mole % $O_2$, about 0.1 to about 4 mole % $H_2O$ and an inert gas. The conditions utilized in this step are: a temperature of about 350° to about 500° C., with best results obtained at a temperature of about 375° to about 450° C., a pressure sufficient to maintain the flow of the first gaseous mixture through the zone containing the deactivated catalyst, such as a pressure of about 1 to about 35 atmospheres and preferably about 1 to about 7 atmospheres, and a gas hourly space velocity (defined as the volume rate of the flow of the gas stream per hour at standard conditions divided by the volume of the bed of catalyst particles) of about 100 to about 25,000 hr.$^{-1}$, with a preferred value of about 500 to about 7,000 hr.$^{-1}$. This first step is performed for a first period sufficient to substantially remove carbonaceous material from the catalyst. In general, depending obviously upon the amount of carbonaceous material, initially present on the deactivated catalyst, a first period of about 5 to about 30 or more houre is adequate in most cases, with best results usually obtained in about 20 to 30 or more hours. Ordinarially, this step is terminated when the differential temperature across the zone containing the catalyst is less than 1° C. for a period of about 0.5 to 5 hours.

The second essential step of the present regeneration method is the preliminary oxygen-treating step and involves subjecting the catalyst resulting from the carbon-burning step, to contact with a second gaseous mixture consisting essentially of about 0.2 to about 3 mole % $O_2$, about 0.02 to about 25 mole % $H_2O$ and an inert gas which is typically nitrogen. The temperature utilized in this step is preferably relatively high compared to that used in the carbon-burning step, and is selected from the range of about 500° to about 550° C. The other conditions utilized in this step are preferably the same as used in the carbon-burning step. The duration of this step is at least about 0.5 to about 5 hours, with excellent results usually obtained in about 0.5 to about 2 hours. In a preferred mode of operation, the second gaseous mixture contains about 0.5 to about 2 mole % $O_2$, about 0.1 to about 4 mole % $H_2O$ and an inert gas. In fact, an especially preferred embodiment of this step involves the use of a temperature of about 500° to about 510° C. and a pressure of about 1 to about 7 atm. for a contact time of about 0.5 to about 2 hours. The function of this preliminary oxygen-treating step is to remove trace amounts of carbonaceous materials which were not burned off during the first step and to prepare the catalyst for the rather severe conditions used in the next step.

The third step is the primary oxidation step and it involves subjecting the catalyst resulting from the second step to contact with a third gaseous mixture consisting essentially of about 10 to about 25 mole % $O_2$, about 0.02 to about 25 mole % $H_2O$, and an inert gas which is typically nitrogen. In general, the preferred mode for changing from the second step to the third step involves a gradual increase in the amount of oxygen in the gaseous mixture being charged to the zone containing the catalyst, although in some cases with experience this transition can be a relatively abrupt one. The purpose of this gradual transition is to prevent the development of a substantial temperature rise in the catalyst bed due to incomplete removal of carbonaceous material during the first and the second steps. This third step is generally conducted for a period of at least about 1 to 5 hours at a temperature of about 500° to about 550° C. Once again, the other conditions utilized are preferably identical to those given above in the discussion of the carbon-burning step. Excellent results are obtained in this step when an air stream (i.e., nitrogen containing about 21 mole % $O_2$) containing about 0.1 to about 4 mole % $H_2O$ is used. Especially preferred conditions are a treating time of about 1 to 3 hours at a temperature of about 500° to 510° C. and at a pressure of about 1 to about 7 atm. The function of this third step is essentially to restore the metallic components of the catalyst to a highly oxidized state wherein I have determined the catalyst will be receptive to the following halogen adjustment step.

The halogen adjustment step involves subjecting the catalyst resulting from the primary oxidation step to contact with a fourth gaseous mixture comprising about 1 to about 30 mole % $H_2O$ and about 0.05 to about 5 mole percent of a halogen or a halogen-containing compound and air or an inert gas such as nitrogen. In fact, a preferred gaseous mixture for use in this step comprises an air stream having water and halogen or a halogen-containing compound admixed therewith. Although a halogen gas such as chlorine, bromine or fluorine may be used in this step, it is generally more convenient to employ a halogen-containing compound which upon exposure to the conditions utilized in this step is decomposed to form the corresponding hydrogen halide. Best results are obtained in this step when the halogen-containing compound is hydrogen chloride or hydrogen fluoride. In fact, a preferred procedure, when the halogen component of the catalyst is chlorine, involves the injection of an aqueous solution of hydrogen chloride into the air stream used in an amount sufficient to result in a gasous mixture comprising about 1 to 30 mole % $H_2O$, about 0.05 to about 5 mole % HCl and air. The mole ratio of the halogen to water used in this step is not critical and may be varied over a relatively broad range within the concentration limitation given above for the fourth gaseous mixture. This fourth step is preferably conducted at a temperature of about 400° to about 550° C. and at a pressure sufficient to maintain flow of the mixture through the catalyst for a period of at least about 1 to about 10 hours, with excellent results obtained in a period of about 3 to 5 hours at a temperature of about 500° C. to about 525° C. The purpose of this step is to increase the halogen content of the catalyst to a value corresponding to about 0.1 to about 3.5 wt. percent of the catalyst and preferably about 0.5 to about 1.5 wt. percent of the regenerated catalyst, calculated on an elemental basis.

At the end of the halogen adjustment step, the catalyst bed is purged with a dry nitrogen, helium or any other suitable dry gas stream to displace oxygen and water therefrom for a period of time which can be easily determined by monitoring the effluent gases from the zone containing the catalysts to determine when they are substantially free of oxygen and water (i.e., preferably less than 10 vol. ppm. $H_2O$ and less than 5 vol. ppm. $O_2$).

Following this purge step, the final essential step of the present invention is commenced. It involves contacting the resulting catalyst with a substantially water-free and sulfur compound-free hydrogen stream at a temperature of about 400° to about 600° C. for a final period of at least about 0.5 to about 5 hours. The preferred conditions for this step are a temperature of 525° to 575° C. for a period of at least 0.5 to 2 hours. Once again, the pressure and gaseous flow rates utilized for this step are preferably identical to those reported in conjunction with the discussion of the carbon-burning step. The purpose of this reduction step is to reduce the platinum group of the catalyst components to an elemental metallic state while maintaining the group IVA metallic component in a positive oxidation state, thereby producing a regenerated catalyst having activity, selectivity, and stability characteristics comparable to those possessed initially by the fresh catalyst.

In many cases, it is advantageous to subject the regenerated catalyst obtained from the reduction step to an additional sulfiding treatment step before it is returned to hydrocarbon conversion service. Although any method known to the art for sulfiding a catalyst can be utilized in this optional step, the preferred procedure involves contacting a suitable sulfide-producing compound with the reduced catalyst at a temperature of about 20° to 550° C. for a period sufficient to incorporate about 0.01 to about 0.5 wt. percent sulfur. The sulfide-producing compound utilized may be selected from the volatile sulfides, the mercaptans, the disulfides and the like compounds; however, best results are ordinarily obtained with hydrogen sulfide. The hydrogen sulfide may be utilized by itself or in admixture with a suitable carrier gas such as hydrogen, nitrogen or the like. Good results have been obtained at a temperature of 375° C. and a pressure of 100 psig. with a mixture of $H_2$ and $H_2S$.

Following this reduction step, or the optional sulfiding step, the hydrocarbon conversion process in which the catalyst is utilized may be restarted by once again charging the hydrocarbon stream in the presence of hydrogen to the zone containing the catalyst at conditions designed to produce the desired product. In the preferred case, this involves re-establishing reforming conditions within the zone containing the catalyst.

It is intended to cover by the following claims all changes and modifications of the above disclosure of the present invention that would be self-evident to a man of ordinary skill in the catalyst regeneration art.

I CLAIM AS MY INVENTION:

1. A method for regenerating a deactivated hydrocarbon conversion catalyst comprising a combination of a platinum group component, a group IVA metallic component, and a halogen component with a refractory inorganic oxide material, the catalyst having been deactivated by deposition of carbonaceous materials thereon during a previous contacting with a hydrocarbon charge stock at an elevated temperature, said method comprising the steps of:

1. contacting the deactivated catalyst with a substantially sulfur compound-free first gaseous mixture consisting essentially of about 0.2 to about 3 mole % $O_2$, about 0.02 to about 25 mole % $H_2O$ and an inert gas at a pressure sufficient to maintain flow of said mixture through the catalyst and at a temperature of about 350 to about 500° C. for a first period sufficient to substantially remove said carbonaceous materials;
   2. subjecting the catalyst resulting from step (1) to contact with a substantially sulfur compound-free second gaseous mixture consisting essentially of about 0.2 to about 3 mole % $O_2$, about 0.02 to about 25 mole % $H_2O$, and an inert gas for a second period of at least about 0.5 to 5 hours at a temperature of about 500° to about 550° C. and at a pressure sufficient to maintain flow of said mixture through the catalyst;
   3. contacting the catalyst resulting from step (2) with a substantially sulfur compound-free third gaseous mixture consisting essentially of about 10 to about 25 mole % $O_2$, about 0.2 to about 25 mole % $H_2O$, and an inert gas for a third period of at least about 1 to 5 hours at a temperature of about 500° to 550° C. and at a pressure sufficient to maintain flow of said mixture through the catalyst;
   4. subjecting the catalyst resulting from step (3) to contact with a substantially sulfur compound-free fourth gaseous mixture comprising about 1 to about 30 mole % $H_2O$ and about 0.05 to about 5 mole percent of a halogen or a halogen-containing compound and air or an inert gas for a fourth period of at least about 1 to about 10 hours at a temperature of about 400° to about 550° C. and at a pressure sufficient to maintain flow of said mixture through the catalyst;
   5. purging oxygen and water from contact with the catalyst from step (4) with an inert gas stream; and,
   6. subjecting the catalyst resulting from step (5) to contact with a substantially water-free and sulfur compound-free hydrogen stream at a temperature of about 400° to about 600° C. for a final period of at least about 0.5 to about 5 hours, thereby producing a regenerated hydrocarbon conversion catalyst.

2. A method as defined in claim 1 wherein the platinum group component of the catalyst is platinum or a compound of platinum.

3. A method as defined in claim 1 wherein the platinum group component of the catalyst is palladium or a compound of palladium.

4. A method as defined in claim 1 wherein said halogen component of said catalyst is chlorine or a compound of chlorine.

5. A method as defined in claim 1 wherein said halogen component of said catalyst is fluorine or a compound of fluorine.

6. A method as defined in claim 1 wherein the group IVA metallic component of said catalyst is germanium or a compound of germanium.

7. A method as defined in claim 1 wherein the group IVA metallic component of said catalyst is tin or a compound of tin.

8. A method as defined in claim 1 wherein the group IVA metallic component of the catalyst is lead or a compound of lead.

9. A method as defined in claim 1 wherein said refractory inorganic oxide is alumina.

10. A method as defined in claim 9 wherein said alumina carrier material is gamma- or eta-alumina.

11. A method as defined in claim 1 wherein the deactivated catalyst contains, on a carbonaceous material-free and elemental basis, about 0.1 to about 3.5 wt. percent halogen, about 0.01 to about 2 wt. percent platinum group metal and about 0.01 to about 5 wt. percent group IVA metal.

12. A method as defined in claim 1 wherein the deactivated catalyst comprises a combination of a platinum component, a chlorine component and a tin component with an alumina carrier material in amounts sufficient to result in a catalyst containing, on a carbonaceous material-free and elemental basis, about 0.1 to about 3.5 wt. percent chlorine, about 0.01 to bout 2 wt. percent platinum and about 0.05 to about 2 wt. percent tin.

13. A method as defined in claim 1 wherein the deactivated catalyst contains, on a carbonaceous material-free basis, about 0.01 to about 0.5 wt. percent of a sulfur component.

14. A method as defined in claim 1 wherein said deactivated catalyst comprises a combination of a platinum component, a chlorine component and a germanium component with an alumina carrier materail in amounts sufficient to result in a catalyst containing, on a carbonaceous material-free and elemental basis, about 0.1 to bout 3.5 wt. percent chlorine, about 0.01 to about 2 wt. percent platinum and about 0.01 to about 5 wt. percent germanium.

15. A method as defined in claim 1 wherein the halogen component of the deactivated catalyst is chlorine or a compound of chlorine and the halogen or halogen-containing compound contained in the fourth gaseous mixture is hydrogen chloride.

16. A method as defined in claim 1 wherein the first and second gaseous mixtures consist essentially of about 0.5 to about 2 mole % $O_2$, about 0.1 to about 4 mole % $H_2O$, and an inert gas.

17. A method as defined in claim 1 wherein the third gaseous mixture consists essentially of an air stream containing about 0.1 to about 4 mole % $H_2O$.

18. A method as defined in claim 1 wherein step (1) is performed at a temperature of about 375° to about 450° C.

19. A method as defined in claim 1 wherein step (6) is performed at a temperature of about 525° to about 575° C.

20. A method for regenerating a deactivated hydrocarbon conversion catalyst comprising a combination of a platinum group component, a group IVA metallic component, and a halogen component with refractory inorganic oxide material, the catalyst having been deactivated by deposition of carbonaceous materials thereon during a previous contacting with a hydrocarbon charge stock at an elevated temperature, said method comprising a combination of the method defined in claim 1 with the step of sulfiding the catalyst resulting from step (6) by contacting same at a temperature of about 20° to 550° C. with a sulfide-producing compound in an amount sufficient to result in a regenerated catalyst containing about 0.01 to about 0.5 wt. percent sulfur.

21. A method as defined in claim 20 wherein said sulfide-producing compound is $H_2S$.

* * * * *